US006794106B2

(12) United States Patent
Dickerson et al.

(10) Patent No.: US 6,794,106 B2
(45) Date of Patent: Sep. 21, 2004

(54) RADIOGRAPHIC IMAGING ASSEMBLY FOR MAMMOGRAPHY

(75) Inventors: Robert E. Dickerson, Hamlin, NY (US); William E. Moore, Macedon, NY (US); David J. Steklenski, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 10/621,968

(22) Filed: Jul. 17, 2003

(65) Prior Publication Data

US 2004/0096770 A1 May 20, 2004

Related U.S. Application Data

(63) Continuation-in-part of application No. 10/299,682, filed on Nov. 19, 2002, now abandoned.

(51) Int. Cl.[7] ............................ G03C 5/17; G03C 1/46; G03B 11/00; G03B 42/04; C09K 11/08

(52) U.S. Cl. ........................ 430/139; 430/502; 430/509; 430/966; 430/967; 250/482.1; 252/301.4 R; 252/301.4 H; 378/63; 378/185

(58) Field of Search ................................. 430/139, 502, 430/509, 966, 967; 250/482.1; 252/301.4 R, 301.4 H; 378/63, 185

(56) References Cited

U.S. PATENT DOCUMENTS

| | | | |
|---|---|---|---|
| 4,659,654 | A | 4/1987 | Metoki et al. |
| 4,710,637 | A | 12/1987 | Luckey et al. |
| 4,937,180 | A | 6/1990 | Marchetti et al. |
| 4,945,035 | A | 7/1990 | Keevert, Jr. et al. |
| 5,455,139 | A | 10/1995 | Wada et al. |
| 5,494,789 | A | 2/1996 | Daubendiek et al. |
| 5,503,970 | A | 4/1996 | Olm et al. |
| 5,503,971 | A | 4/1996 | Daubendiek et al. |
| 5,558,981 | A | 9/1996 | Bayley |
| 5,738,981 | A | 4/1998 | Dickerson et al. |
| 5,759,754 | A | 6/1998 | Dickerson |
| 5,853,967 | A | 12/1998 | Dickerson |
| 5,998,083 | A | 12/1999 | Verbeeck et al. |
| 6,033,840 | A | 3/2000 | Dickerson |
| 6,037,112 | A | 3/2000 | Dickerson |
| 6,277,552 | B1 | 8/2001 | Elst et al. |
| 6,348,293 | B1 | 2/2002 | Verbeeck et al. |

FOREIGN PATENT DOCUMENTS

| | | |
|---|---|---|
| EP | 1 217 433 A2 | 6/2002 |
| EP | 1 223 464 A2 | 7/2002 |
| EP | 1 271 236 A2 | 1/2003 |

OTHER PUBLICATIONS

USSN 10/ 299,936 filed Nov. 19, 2002, titled *Radiographic Film With Improved Signal detection For Mammography*, by Adin et al.

USSN 10/ 299,458 filed Nov. 19, 2002, titled *Radiographic Mammography Film Having Improved Processability, Imaging Assembly And Method of Imaging* by Adin et al.

USSN 10/ 299,765 filed Nov. 19, 2002, titled *Mammography Film And Imaging Assembly For Use With Rhodium or Tungsten Anodes*, by Dickerson et al.

USSN 10/ 299,941 filed Nov. 19, 2002on even date herewith, titled *Mammography Imaging Method Using High Peak Voltage*, by Dickerson et al.

USSN 10/ 299,759 filed Nov. 19, 2002, titled *Mammography Imaging Method Using High Peak Voltage and Rhodium Or Tungsten Anodes*, by Dickerson et al.

USSN 10/299,475 filed Nov. 19, 2002, titled *High Bromide Cubic Grain Emulsions*, by Adin et al.

*Primary Examiner*—Richard L. Schilling
(74) *Attorney, Agent, or Firm*—J. Lanny Tucker

(57) ABSTRACT

A radiographic imaging assembly comprises a radiographic silver halide film having a film speed of at least 100 and a single fluorescent intensifying screen that has a screen speed of at least 200. This imaging assembly is particularly useful for mammography or imaging or other soft tissues.

18 Claims, 1 Drawing Sheet

RADIOGRAPHIC IMAGING ASSEMBLY FOR MAMMOGRAPHY

RELATED APPLICATION

This is a Continuation-in-part of U.S. Ser. No. 10/299,682 filed Nov. 19, 2002 now abandoned by Dickerson, Steklenski, and Moore.

FIELD OF THE INVENTION

This invention is directed to radiography. In particular, it is directed to a radiographic imaging assembly containing a radiographic silver halide film and a single fluorescent intensifying screen that provides improved medical diagnostic images of soft tissues such as in mammography.

BACKGROUND OF THE INVENTION

The use of radiation-sensitive silver halide emulsions for medical diagnostic imaging can be traced to Roentgen's discovery of X-radiation by the inadvertent exposure of a silver halide film. Eastman Kodak Company then introduced its first product specifically that was intended to be exposed by X-radiation in 1913.

In conventional medical diagnostic imaging the object is to obtain an image of a patient's internal anatomy with as little X-radiation exposure as possible. The fastest imaging speeds are realized by mounting a dual-coated radiographic element between a pair of fluorescent intensifying screens for imagewise exposure. About 5% or less of the exposing X-radiation passing through the patient is adsorbed directly by the latent image forming silver halide emulsion layers within the dual-coated radiographic element. Most of the X-radiation that participates in image formation is absorbed by phosphor particles within the fluorescent screens. This stimulates light emission that is more readily absorbed by the silver halide emulsion layers of the radiographic element.

Examples of radiographic element constructions for medical diagnostic purposes are provided by U.S. Pat. No. 4,425,425 (Abbott et al.) and U.S. Pat. No. 4,425,426 (Abbott et al.), U.S. Pat. No. 4,414,310 (Dickerson), U.S. Pat. No. 4,803,150 (Kelly et al.), U.S. Pat. No. 4,900,652 (Kelly et al.), U.S. Pat. No. 5,252,442 (Tsaur et al.), and *Research Disclosure*, Vol. 184, August 1979, Item 18431.

While the necessity of limiting patient exposure to high levels of X-radiation was quickly appreciated, the question of patient exposure to even low levels of X-radiation emerged gradually. The separate development of soft tissue radiography, which requires much lower levels of X-radiation, can be illustrated by mammography. The first intensifying screen-film combination (imaging assembly) for mammography was introduced to the public in the early 1970's. Mammography film generally contains a single silver halide emulsion layer and is exposed by a single intensifying screen, usually interposed between the film and the source of X-radiation. Mammography utilizes low energy X-radiation, that is radiation that is predominantly of an energy level less than 40 keV.

U.S. Pat. No. 6,033,840 (Dickerson) and U.S. Pat. No. 6,037,112 (Dickerson) describe asymmetric imaging elements and processing methods for imaging soft tissue.

Problem to be Solved

In mammography, as in many forms of soft tissue radiography, pathological features sought to be identified are often quite small and not much different in density than surrounding healthy tissue. Thus, relatively high average contrast, in the range of from 2.5 to 3.5, over a density range of from 0.25 to 2.0 is typical. Limiting X-radiation energy levels increases the absorption of the X-radiation by the intensifying screen and minimizes X-radiation exposure of the film, which can contribute to loss of image sharpness and contrast. Thus mammography is a very difficult task in medical radiography. In addition, microcalcifications must be seen when they are as small as possible to improve detection and treatment of breast cancers. As a result, there is desire to improve the image quality of mammography films. Improvements in image quality in imaging assemblies can be achieved by increasing the signal (that is, contrast) and modulating transfer function (MTF) and/or decreasing noise (reducing film/granularity and lowering quantum mottle). However, it would be desirable to achieve all of these results without the loss of other sensitometric properties.

SUMMARY OF THE INVENTION

This invention provides a solution to the noted problems with a radiographic imaging assembly comprising:

A) a radiographic silver halide film comprising a support having first and second major surfaces and that is capable of transmitting X-radiation, the radiographic silver halide film having a film speed of at least 100,
 the radiographic silver halide film having disposed on the first major support surface, one or more hydrophilic colloid layers including at least one silver halide emulsion layer, and on the second major support surface, one or more hydrophilic colloid layers including at least one silver halide emulsion layer,
 at least one of the silver halide emulsion layers comprising cubic silver halide cubic grains that have the same or different composition, and B) arranged in association with the radiographic silver halide film, a single fluorescent intensifying screen that has a screen speed of at least 200 and comprises an inorganic phosphor capable of absorbing X-rays and emitting electromagnetic radiation having a wavelength greater than 300 nm, the inorganic phosphor being coated in admixture with a polymeric binder in a phosphor layer onto a flexible support and having a protective overcoat disposed over the phosphor layer.

Further, this invention provides a method of providing a black-and-white image comprising exposing the radiographic imaging assembly described above and processing the radiographic silver halide film, sequentially, with a black-and-white developing composition and a fixing composition, the processing being carried out within 90 seconds, dry-to-dry.

The present invention provides a means for providing radiographic images for mammography exhibiting improved image quality by increasing the radiographic signal while decreasing noise.

In addition, all other desirable sensitometric properties are maintained and the radiographic film can be rapidly processed in the same conventional processing equipment and compositions.

These advantages are achieved by using a novel combination of a radiographic film that has a film speed of at least 100 and a single fluorescent intensifying screen that has a screen speed of at least 200. Thus, while the imaging assembly of the present invention has an overall photographic speed that is comparable to known mammographic imaging assemblies, it provides improved image quality and processability.

DETAILED DESCRIPTION OF THE INVENTION

Figure 1:
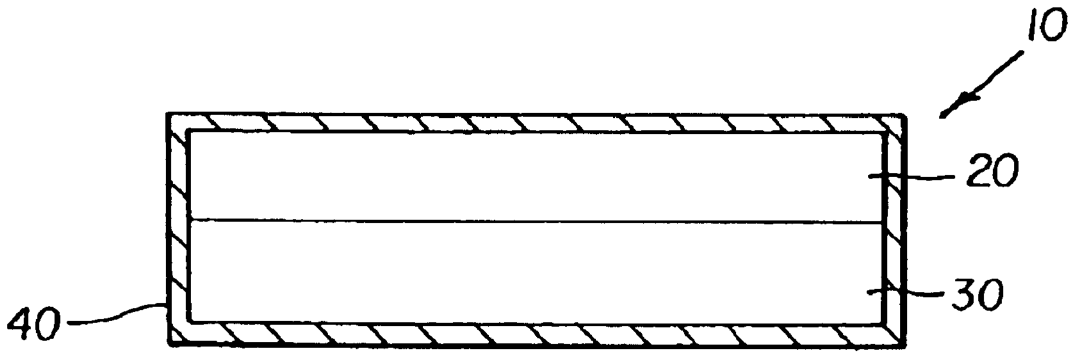
FIG. 1 is a schematic cross-sectional illustration of an embodiment of this invention comprising a radiographic silver halide film and a single fluorescent intensifying screen in a cassette holder.

The term "contrast" as herein employed indicates the average contrast derived from a characteristic curve of a radiographic film using as a first reference point (1) a density ($D_1$) of 0.25 above minimum density and as a second reference point (2) a density ($D_2$) of 2.0 above minimum density, where contrast is $\Delta D$ (i.e. 1.75)$\div\Delta\log_{10}E$ ($\log_{10}E_2-\log_{10}E_1$), $E_1$ and $E_2$ being the exposure levels at the reference points (1) and (2).

"Gamma" is described as the instantaneous rate of change of a D logE sensitometric curve or the instantaneous contrast at any logE value.

"System speed" is a measurement given to combinations ("systems" or imaging assemblies) of radiographic silver halide films and fluorescent intensifying screens that is calculated using the conventional ISO 9236-3 standard wherein the radiographic film is exposed and processed under the conditions specified in Eastman Kodak Company's Service Bulletin 30. In general, system speed is thus defined as 1 milliGray/$K_s$ wherein $K_s$ is Air Kerma (in Grays) required to achieve a density=1.0+$D_{min}$+fog. In addition, 1 milliRoentgen (mR) is equal to 0.008732 milliGray (mGray). For example, by definition, if 0.1 milliGray (equal to 11.4 mR) incident on a film-screen system creates a density of 1.0 above $D_{min}$+fog, that film-screen system is considered to have a speed of "10".

However, it is common in the trade to use a "scaled" version of system speed, wherein commercially available KODAK Min-R 2000 radiographic film used in combination with a commercially available KODAK Min-R 2000 intensifying screen is assigned or designated a speed value of "150". Bunch et al. *SPIE Medical Imaging*, Vol. 3659 (1999), pp. 120–130 shows that it requires 6.3 mR for such a KODAK Min-R 2000 film/screen system to reach a density of 1.0 above $D_{min}$+fog. This gives an ISO speed value of 18.1 for this particular system. Thus, the relationship between the ISO speed value and the common definition of system speed is the ratio 150/18.1=8.25. That is, the numerical values of the common system speed values are 8.25 times those directly obtained using equation 7.1 of the noted ISO 9236-3 standard.

The "scaled" system speed values common in the trade are used in this application. However, they can be converted to ISO speed values by dividing them by 8.25.

In this application, "film speed" has been given a standard of "150" for a commercially available KODAK Min-R 2000 radiographic film that has been exposed for 1 second and processed according to the Service Bulletin 30 using a fluorescent intensifying screen containing a terbium activated gadolinium oxysulfide phosphor (such as Screen X noted below in the Example). Thus, if the $K_s$ value for a given system using a given radiographic film is 50% of that for a second film with the same screen and exposure and processing conditions, the first film is considered to have a speed 200% greater than that of the second film.

Also in this application, "screen speed" has been given a standard of "200" for a conventional KODAKMin-R 2000 screen containing a terbium activated gadolinium oxysulfide phosphor. Thus, if the $K_s$ value for a given system using a given screen with a given radiographic film is 50% of that for a second screen with the same film and exposure and processing conditions, the first screen is considered to have a speed 200% greater than that of the second screen.

"Photicity" is the integral from the minimum wavelength of the light emitted by the screen to the maximum wavelength of the intensity of light emitted by the screen divided by the sensitivity of the recording medium (film). This is shown by the following equation where $I(\lambda)$ is the intensity of the light emitted by the screen at wavelength $\lambda$ and $S(\lambda)$ is the sensitivity of the film at wavelength $\lambda$. $S(\lambda)$ is in units of ergs/$cm^2$ required to reach a density of 1.0 above base plus fog.

$$Photicity = \int_{\lambda\,min}^{\lambda\,max} \frac{I(\lambda)}{S(\lambda)} d\lambda$$

Image tone can be evaluated using conventional CIELAB (Commission Internationale de l'Eclairage) a* and b* values that can be evaluated using the techniques described by Billmeyer et al., *Principles of Color Technology,* 2nd Edition, Wiley & Sons, New York, 1981, Chapter 3. The a* value is a measure of reddish tone (positive a*) or greenish tone (negative a*). The b* value is a measure of bluish tone (negative b*) or yellowish tone (positive b*).

The term "fully forehardened" is employed to indicate the forehardening of hydrophilic colloid layers to a level that limits the weight gain of a radiographic film to less than 120% of its original (dry) weight in the course of wet processing. The weight gain is almost entirely attributable to the ingestion of water during such processing.

The term "rapid access processing" is employed to indicate dry-to-dry processing of a radiographic film in 45 seconds or less. That is, 45 seconds or less elapse from the time a dry imagewise exposed radiographic film enters a wet processor until it emerges as a dry fully processed film.

In referring to grains and silver halide emulsions containing two or more halides, the halides are named in order of ascending molar concentrations.

The term "equivalent circular diameter" (ECD) is used to define the diameter of a circle having the same projected area as a silver halide grain.

The term "aspect ratio" is used to define the ratio of grain ECD to grain thickness.

The term "coefficient of variation" (COV) is defined as 100 times the standard deviation (a) of grain ECD divided by the mean grain ECD.

The term "covering power" is used to indicate 100 times the ratio of maximum density to developed silver measured in mg/$dm^2$.

The term "dual-coated" is used to define a radiographic film having silver halide emulsion layers disposed on both the front- and backsides of the support. The radiographic silver halide films used in the present invention are "dual-coated."

The term "exposure latitude" refers to the width of the gamma/logE curves for which contrast values were greater than 1.5.

The term "dynamic range" refers to the range of exposures over which useful images can be obtained (usually having a gamma greater than 2).

The terms "kVp" and "MVp" stand for peak voltage applied to an X-ray tube times 103 and 106, respectively.

The term "fluorescent intensifying screen" refers to a screen that absorbs X-radiation and emits light. A "prompt" emitting fluorescent intensifying screen will emit light immediately upon exposure to radiation while a "storage" fluorescent screen can "store" the exposing X-radiation for emission at a later time when the screen is irradiated with other radiation (usually visible light).

The terms "front" and "back" refer to layers, films, or fluorescent intensifying screens nearer to and farther from, respectively, the source of X-radiation.

The term "rare earth" is used to indicate chemical elements having an atomic number of 39 or 57 through 71.

*Research Disclosure* is published by Kenneth Mason Publications, Ltd., Dudley House, 12 North St., Emsworth, Hampshire P010 7DQ England. It is also available from Emsworth Design Inc., 147 West 24th Street, New York, N.Y. 10011.

The radiographic silver halide films useful in this invention include a flexible support having disposed on both sides thereof, one or more photographic silver halide emulsion layers and optionally one or more non-radiation sensitive hydrophilic layer(s). The silver halide emulsions in the various layers can be the same or different and can comprise mixtures of various silver halide emulsions.

In preferred embodiments, the photographic silver halide film has different silver halide emulsions on opposite sides of the support. It is also preferred that the film has a protective overcoat (described below) over the silver halide emulsions on each side of the support.

The support can take the form of any conventional radiographic film support that is X-radiation and light transmissive. Useful supports for the films of this invention can be chosen from among those described in *Research Disclosure*, September 1996, Item 38957 XV. Supports and *Research Disclosure*, Vol. 184, August 1979, Item 18431, XII. Film Supports.

The support is preferably a transparent film support. In its simplest possible form the transparent film support consists of a transparent film chosen to allow direct adhesion of the hydrophilic silver halide emulsion layers or other hydrophilic layers. More commonly, the transparent film is itself hydrophobic and subbing layers are coated on the film to facilitate adhesion of the hydrophilic silver halide emulsion layers. Typically the film support is either colorless or blue tinted (tinting dye being present in one or both of the support film and the subbing layers). Referring to *Research Disclosure*, Item 38957, Section XV Supports, cited above, attention is directed particularly to paragraph (2) that describes subbing layers, and paragraph (7) that describes preferred polyester film supports.

Polyethylene terephthalate and polyethylene naphthalate are the preferred transparent film support materials.

In the more preferred embodiments, at least one non-light sensitive hydrophilic layer is included with the one or more silver halide emulsion layers on each side of the film support. This layer may be called an interlayer or overcoat, or both.

The silver halide grains useful in this invention can have any desirable morphology including, but not limited to, cubic, octahedral, tetradecahedral, rounded, spherical or other non-tabular morphologies, or be comprised of a mixture of two or more of such morphologies. Preferably, the grains in each silver halide emulsion have cubic morphology.

Preferably, the "frontside" of the support (first major support surface) comprises one or more silver halide emulsion layers, one of which contains predominantly cubic grains (that is, more than 50 weight % of all grains). These cubic silver halide grains particularly include predominantly (at least 70 mol %) bromide, and preferably at least 90 mol % bromide, based on total silver in the emulsion layer. In addition, these cubic grains can have up to 2 mol % iodide, based on total silver in the emulsion layer. The cubic silver halide grains in each silver halide emulsion unit (or silver halide emulsion layers) can be the same or different.

The non-cubic silver halide grains in the "frontside" emulsion layers can have any desirable morphology including, but not limited to, octahedral, tetradecahedral, rounded, spherical or other non-tabular morphologies, or be comprised of a mixture of two or more of such morphologies.

It may also be desirable to employ silver halide grains that exhibit a coefficient of variation (COV) of grain ECD of less than 20% and, preferably, less than 10%. In some embodiments, it may be desirable to employ a grain population that is as highly monodisperse as can be conveniently realized.

The average silver halide grain size (ECD) can vary within each radiographic silver halide film and within each emulsion layer within that film. For example, the average grain size in each radiographic silver halide film is independently and generally from about 0.7 to about 0.9 $\mu$m (preferably from about 0.75 to about 0.85 $\mu$m), but the average grain size can be different in the various emulsion layers.

The "backside" of the support (second major support surface) also includes one or more silver halide emulsions, preferably at least one of which comprises predominantly tabular silver halide grains. Generally, at least 50% (and preferably at least 80%) of the silver halide grain projected area in this silver halide emulsion layer is provided by tabular grains having an average aspect ratio greater than 5, and more preferably greater than 10. The remainder of the silver halide projected area is provided by silver halide grains having one or more non-tabular morphologies. In addition, the tabular grains are predominantly (at least 90 mol %) bromide based on the total silver in the emulsion layer and can include up to 1 mol % iodide. Preferably, the tabular grains are pure silver bromide.

Tabular grain emulsions that have the desired composition and sizes are described in greater detail in the following patents, the disclosures of which are incorporated herein by reference:

U.S. Pat. No. 4,414,310 (Dickerson), U.S. Pat. No. 4,425,425 (Abbott et al.), U.S. Pat. No. 4,425,426 (Abbott et al.), U.S. Pat. No. 4,439,520 (Kofron et al.), U.S. Pat. No. 4,434,226 (Wilgus et al.), U.S. Pat. No. 4,435,501 (Maskasky), U.S. Pat. No. 4,713,320 (Maskasky), U.S. Pat. No. 4,803,150 (Dickerson et al.), U.S. Pat. No. 4,900,355 (Dickerson et al.), U.S. Pat. No. 4,994,355 (Dickerson et al.), U.S. Pat. No. 4,997,750 (Dickerson et al.), U.S. Pat. No. 5,021,327 (Bunch et al.), U.S. Pat. No. 5,147,771 (Tsaur et al.), U.S. Pat. No. 5,147,772 (Tsaur et al.), U.S. Pat. No. 5,147,773 (Tsaur et al.), U.S. Pat. No. 5,171,659 (Tsaur et al.), U.S. Pat. No. 5,252,442 (Dickerson et al.), U.S. Pat. No. 5,370,977 (Zietlow), U.S. Pat. No. 5,391,469 (Dickerson), U.S. Pat. No. 5,399,470 (Dickerson et al.), U.S. Pat. No. 5,411,853 (Maskasky), U.S. Pat. No. 5,418,125 (Maskasky), U.S. Pat. No. 5,494,789 (Daubendiek et al.), U.S. Pat. No. 5,503,970 (Olm et al.), U.S. Pat. No. 5,536,632 (Wen et al.), U.S. Pat. No. 5,518,872 (King et al.), U.S. Pat. No. 5,567,580 (Fenton et al.), U.S. Pat. No. 5,573,902 (Daubendiek et al.), U.S. Pat. No. 5,576,156 (Dickerson), U.S. Pat. No. 5,576,168 (Daubendiek et al.), U.S. Pat. No. 5,576,171 (Olm et al.), and U.S. Pat. No. 5,582,965 (Deaton et al.). The patents to Abbott et al., Fenton et al., Dickerson, and Dickerson et al. are also cited and incorporated herein to show conventional radiographic film features in addition to gelatino-vehicle, high bromide (≧80 mol % bromide based on total silver) tabular grain emulsions and other features useful in the present invention.

The "backside" of the radiographic silver halide film also preferably includes an antihalation layer disposed over the one or more silver halide emulsion layers. This layer comprises one or more antihalation dyes or pigments dispersed on a suitable hydrophilic binder (described below). In general, such antihalation dyes or pigments are chosen to absorb whatever radiation the film is likely to be exposed to from a fluorescent intensifying screen. For example, pigments and dyes that can be used for antihalation purposes include various water-soluble, liquid crystalline, or particulate magenta or yellow filter dyes or pigments including those described for example in U.S. Pat. No. 4,803,150 (Dickerson et al.), U.S. Pat. No. 5,213,956 (Diehl et al.), U.S. Pat. No. 5,399,690 (Diehl et al.), U.S. Pat. No. 5,922,523 (Helber et al.), U.S. Pat. No. 6,214,499 (Helber et al.), and Japanese Kokai 2-123349, all of which are incorporated herein by reference for pigments and dyes useful in the practice of this invention. One useful class of particulate antihalation dyes includes nonionic polymethine dyes such as merocyanine, oxonol, hemioxonol, styryl, and arylidene dyes as described in U.S. Pat. No. 4,803,150 (noted above) that is incorporated herein for the definitions of those dyes. The magenta merocyanine and oxonol dyes are preferred and the oxonol dyes are most preferred.

The amounts of such dyes or pigments in the antihalation layer would be readily known to one skilled in the art. A particularly useful antihalation dye is the dye M-1 identified below in the Example.

A variety of silver halide dopants can be used, individually and in combination, to improve contrast as well as other common properties, such as speed and reciprocity characteristics. A summary of conventional dopants to improve speed, reciprocity and other imaging characteristics is provided by *Research Disclosure*, Item 38957, cited above, Section I. Emulsion grains and their preparation, sub-section D. Grain modifying conditions and adjustments, paragraphs (3), (4), and (5).

The emulsions used in the radiographic silver halide films can be doped with any of conventional dopants to increase the contrast. Mixtures of dopants can be used also. As is well known in the art, dopants can be chosen in amounts to give the radiographic film used in this invention a film speed of at least 100. Particularly useful dopants are hexacoordination complexes of Group 8 transition metals such as ruthenium.

A general summary of silver halide emulsions and their preparation is provided by *Research Disclosure*, Item 38957, cited above, Section I. Emulsion grains and their preparation. After precipitation and before chemical sensitization the emulsions can be washed by any convenient conventional technique using techniques disclosed by *Research Disclosure*, Item 38957, cited above, Section III. Emulsion washing.

The emulsions can be chemically sensitized by any convenient conventional technique as illustrated by *Research Disclosure*, Item 38957, Section IV. Chemical Sensitization: Sulfur, selenium or gold sensitization (or any combination thereof) is specifically contemplated. Sulfur sensitization is preferred, and can be carried out using for example, thiosulfates, thiosulfonates, thiocyanates, isothiocyanates, thioethers, thioureas, cysteine or rhodanine. A combination of gold and sulfur sensitization is most preferred.

In addition, if desired, the silver halide emulsions can include one or more suitable spectral sensitizing dyes, for example cyanine and merocyanine spectral sensitizing dyes, including the benzimidazolocarbocyanine dyes described in U.S. Pat. No. 5,210,014 (Anderson et al.), incorporated herein by reference. The useful amounts of such dyes are well known in the art but are generally within the range of from about 200 to about 1000 mg/mole of silver in the emulsion layer.

Instability that increases minimum density in negative-type emulsion coatings (that is fog) can be protected against by incorporation of stabilizers, antifoggants, antikinking agents, latent-image stabilizers and similar addenda in the emulsion and contiguous layers prior to coating. Such addenda are illustrated by *Research Disclosure*, Item 38957, Section VII. Antifoggants and stabilizers, and Item 18431, Section II: Emulsion Stabilizers, Antifoggants and Anfikinking Agents.

It may also be desirable that one or more silver halide emulsion layers include one or more covering power enhancing compounds adsorbed to surfaces of the silver halide grains. A number of such materials are known in the art, but preferred covering power enhancing compounds contain at least one divalent sulfur atom that can take the form of a —S— or =S moiety. Such compounds include, but are not limited to, 5-mercapotetrazoles, dithioxotriazoles, mercapto-substituted tetraazaindenes, and others described in U.S. Pat. No. 5,800,976 (Dickerson et al.) that is incorporated herein by reference for the teaching of the sulfur-containing covering power enhancing compounds.

The silver halide emulsion layers and other hydrophilic layers on both sides of the support of the radiographic films generally contain conventional polymer vehicles (peptizers and binders) that include both synthetically prepared and naturally occurring colloids or polymers. The most preferred polymer vehicles include gelatin or gelatin derivatives alone or in combination with other vehicles. Conventional gelatino-vehicles and related layer features are disclosed in *Research Disclosure*, Item 38957, Section II. Vehicles, vehicle extenders, vehicle-like addenda and vehicle related addenda. The emulsions themselves can contain peptizers of the type set out in Section II, paragraph A. Gelatin and hydrophilic colloid peptizers. The hydrophilic colloid peptizers are also useful as binders and hence are commonly present in much higher concentrations than required to perform the peptizing function alone. The preferred gelatin vehicles include alkali-treated gelatin, acid-treated gelatin or gelatin derivatives (such as acetylated gelatin, deionized gelatin, oxidized gelatin and phthalated gelatin). Cationic starch used as a peptizer for tabular grains is described in U.S. Pat. No. 5,620,840 (Maskasky) and U.S. Pat. No. 5,667,955 (Maskasky). Both hydrophobic and hydrophilic synthetic polymeric vehicles can be used also. Such materials include, but are not limited to, polyacrylates (including polymethacrylates), polystyrenes and polyacrylamides (including polymethacrylamides). Dextrans can also be used as part or all of the binder materials in an emulsion layer. Examples of such materials are described for example in U.S. Pat. No. 5,876,913 (Dickerson et al.), incorporated herein by reference.

The silver halide emulsion layers (and other hydrophilic layers) in the radiographic films are generally fully hardened using one or more conventional hardeners. Thus, the amount of hardener in each silver halide emulsion and other hydrophilic layer is generally at least 2% and preferably at least 2.5%, based on the total dry weight of the polymer vehicle in each layer.

Conventional hardeners can be used for this purpose, including but not limited to formaldehyde and free dialdehydes such as succinaldehyde and glutaraldehyde, blocked dialdehydes, α-diketones, active esters, sulfonate esters, active halogen compounds, s-triazines and diazines, epoxides, aziridines, active olefins having two or more active bonds, blocked active olefins, carbodiimides, isoxazolium salts unsubstituted in the 3-position, esters of 2-alkoxy-N-carboxydi-hydroquinoline, N-carbamoyl pyridinium salts, carbamoyl oxypyridinium salts, bis(amidino) ether salts, particularly bis(amidino) ether salts, surface-applied carboxyl-activating hardeners in combination with complex-forming salts, carbamoylonium, carbamoyl pyridinium and carbamoyl oxypyridinium salts in combination with certain aldehyde scavengers, dication ethers, hydroxylamine esters of imidic acid salts and chloroformamidinium salts, hardeners of mixed function such as halogen-substituted aldehyde acids (for example, mucochloric and mucobromic acids), onium-substituted acroleins, vinyl sulfones containing other hardening functional groups, polymeric hardeners such as dialdehyde starches, and poly (acrolein-co-methacrylic acid).

The levels of silver and polymer vehicle in the radiographic silver halide film used in the present invention are not critical. In general, the total amount of silver on each side of each film is at least 10 and no more than 55 mg/dm$^2$ in one or more emulsion layers. In addition, the total amount of polymer vehicle on each side of each film is generally at least 35 and no more than 45 mg/dm$^2$ in one or more hydrophilic layers. The amounts of silver and polymer vehicle on the two sides of the support in the radiographic silver halide film can be the same or different. These amounts refer to dry weights.

Also as noted above, the film speed of the radiographic silver halide film used in the imaging assembly is at least 100. As is well known, photographic speed can be adjusted in various radiographic silver halide films in various ways, for example by using various amounts of spectral sensitizing dyes, varying the silver halide grain size, or the use of specific dopants.

In specific embodiments, the film speed of at least 100 is achieved by using specific dopants in the cubic grain emulsions, or by using specific spectral sensitizing dyes in combination with specific dopants in the cubic grain silver halide emulsions. In addition, photographic speed can be enhanced by replacing some of the gelatin in one or more cubic grain silver halide emulsion layers with dextran or other hydrophilic binders.

The radiographic silver halide films useful in this invention generally include a surface protective overcoat on each side of the support that typically provides physical protection of the emulsion layers. Each protective overcoat can be sub-divided into two or more individual layers. For example, protective overcoats can be sub-divided into surface overcoats and interlayers (between the overcoat and silver halide emulsion layers). In addition to vehicle features discussed above the protective overcoats can contain various addenda to modify the physical properties of the overcoats. Such addenda are illustrated by *Research Disclosure*, Item 38957, Section IX. Coating physical property modifying addenda, A. Coating aids, B. Plasticizers and lubricants, C. Antistats, and D. Matting agents. Interlayers that are typically thin hydrophilic colloid layers can be used to provide a separation between the emulsion layers and the surface overcoats. The overcoat on at least one side of the support can also include a blue toning dye or a tetraazaindene (such as 4-hydroxy-6-methyl-1,3,3a,7-tetraazaindene) if desired.

The protective overcoat is generally comprised of one or more hydrophilic colloid vehicles, chosen from among the same types disclosed above in connection with the emulsion layers. Protective overcoats are provided to perform two basic functions. They provide a layer between the emulsion layers and the surface of the film for physical protection of the emulsion layer during handling and processing. Secondly, they provide a convenient location for the placement of addenda, particularly those that are intended to modify the physical properties of the radiographic film. The protective overcoats of the films of this invention can perform both these basic functions.

The various coated layers of radiographic silver halide films used in this invention can also contain tinting dyes to modify the image tone to transmitted or reflected light. These dyes are not decolorized during processing and may be homogeneously or heterogeneously dispersed in the various layers. Preferably, such non-bleachable tinting dyes are in a silver halide emulsion layer.

The radiographic imaging assemblies of the present invention are composed of one radiographic silver halide film as described herein and a single fluorescent intensifying screen that has a screen speed of at least 200. Fluorescent intensifying screens are typically designed to absorb X-rays and to emit electromagnetic radiation having a wavelength greater than 300 nm. These screens can take any convenient form providing they meet all of the usual requirements for use in radiographic imaging. Examples of conventional, useful fluorescent intensifying screens and methods of making them are provided by *Research Disclosure*, Item 18431, cited above, Section IX. X-Ray Screens/Phosphors, and U.S. Pat. No. 5,021,327 (Bunch et al.), U.S. Pat. No. 4,994,355 (Dickerson et al.), U.S. Pat. No. 4,997,750 (Dickerson et al.), and U.S. Pat. No. 5,108,881 (Dickerson et al.), the disclosures of which are here incorporated by reference. The fluorescent layer contains phosphor particles and a binder, optimally additionally containing a light scattering material, such as titania or light absorbing materials such as particulate carbon, dyes or pigments. Any conventional binder (or mixture thereof) can be used but preferably the binder is an aliphatic polyurethane elastomer or another highly transparent elastomeric polymer.

Any conventional or useful phosphor can be used, singly or in mixtures, in the intensifying screens used in the practice of this invention. For example, useful phosphors are described in numerous references relating to fluorescent intensifying screens, including but not limited to, *Research Disclosure*, Vol. 184, August 1979, Item 18431, Section IX, X-ray Screens/Phosphors, and U.S. Pat. No. 2,303,942 (Wynd et al.), U.S. Pat. No. 3,778,615 (Luckey), U.S. Pat. No. 4,032,471 (Luckey), U.S. Pat. No. 4,225,653 (Brixner et al.), U.S. Pat. No. 3,418,246 (Royce), U.S. Pat. No. 3,428,247 (Yocon), U.S. Pat. No. 3,725,704 (Buchanan et al.), U.S. Pat. No. 2,725,704 (Swindells), U.S. Pat. No. 3,617,743 (Rabatin), U.S. Pat. No. 3,974,389 (Ferri et al.), U.S. Pat. No. 3,591,516 (Rabatin), U.S. Pat. No. 3,607,770 (Rabatin), U.S. Pat. No. 3,666,676 (Rabatin), U.S. Pat. No. 3,795,814 (Rabatin), U.S. Pat. No. 4,405,691 (Yale), U.S. Pat. No. 4,311,487 (Luckey et al.), U.S. Pat. No. 4,387,141 (Patten), U.S. Pat. No. 5,021,327 (Bunch et al.), U.S. Pat. No. 4,865,944 (Roberts et al.), U.S. Pat. No. 4,994,355

(Dickerson et al.), U.S. Pat. No. 4,997,750 (Dickerson et al.), U.S. Pat. No. 5,064,729 (Zegarski), U.S. Pat. No. 5,108,881 (Dickerson et al.), U.S. Pat. No. 5,250,366 (Nakajima et al.), U.S. Pat. No. 5,871,892 (Dickerson et al.), EP-A-0 491,116 (Benzo et al.), the disclosures of all of which are incorporated herein by reference with respect to the phosphors.

Useful classes of phosphors include, but are not limited to, calcium tungstate ($CaWO_4$), activated or unactivated lithium stannates, niobium and/or rare earth activated or unactivated yttrium, lutetium, or gadolinium tantalates, rare earth (such as terbium, lanthanum, gadolinium, cerium, and lutetium)-activated or unactivated middle chalcogen phosphors such as rare earth oxychalcogenides and oxyhalides, and terbium-activated or unactivated lanthanum and lutetium middle chalcogen phosphors.

Still other useful phosphors are those containing hafnium as described for example in U.S. Pat. No. 4,988,880 (Bryan et al.), U.S. Pat. No. 4,988,881 (Bryan et al.), U.S. Pat. No. 4,994,205 (Bryan et al.), U.S. Pat. No. 5,095,218 (Bryan et al.), U.S. Pat. No. 5,112,700 (Lambert et al.), U.S. Pat. No. 5,124,072 (Dole et al.), and U.S. Pat. No. 5,336,893 (Smith et al.), the disclosures of which are all incorporated herein by reference.

Some preferred rare earth oxychalcogenide and oxyhalide phosphors are represented by the following formula (1):

$$M'_{(w-n)}M''_{n}O_{w}X' \quad (1)$$

wherein M' is at least one of the metals yttrium (Y), lanthanum (La), gadolinium (Gd), or lutetium (Lu), M" is at least one of the rare earth metals, preferably dysprosium (Dy), erbium (Er), europium (Eu), holmium (Ho), neodymium (Nd), praseodymium (Pr), samarium (Sm), tantalum (Ta), terbium (Th), thulium (Tm), or ytterbium (Yb), X' is a middle chalcogen (S, Se, or Te) or halogen, n is 0.002 to 0.2, and w is 1 when X' is halogen or 2 when X' is a middle chalcogen. These include rare earth-activated lanthanum oxybromides, and terbium-activated or thulium-activated gadolinium oxides such as $Gd_2O_2S$:Tb.

Other suitable phosphors are described in U.S. Pat. No. 4,835,397 (Arakawa et al.) and U.S. Pat. No. 5,381,015 (Dooms), both incorporated herein by reference, and including for example divalent europium and other rare earth activated alkaline earth metal halide phosphors and rare earth element activated rare earth oxyhalide phosphors. Of these types of phosphors, the more preferred phosphors include alkaline earth metal fluorohalide prompt emitting and/or storage phosphors [particularly those containing iodide such as alkaline earth metal fluorobromoiodide storage phosphors as described in U.S. Pat. No. 5,464,568 (Bringley et al.), incorporated herein by reference].

Another class of useful phosphors includes rare earth hosts such as rare earth activated mixed alkaline earth metal sulfates such as europium-activated barium strontium sulfate.

Particularly useful phosphors are those containing doped or undoped tantalum such as $YTaO_4$, $YTaO_4$:Nb, $Y(Sr)TaO_4$, and $Y(Sr)TaO_4$:Nb. These phosphors are described in U.S. Pat. No. 4,226,653 (Brixner), U.S. Pat. No. 5,064,729 (Zegarski), U.S. Pat. No. 5,250,366 (Nakajima et al.), and U.S. Pat. No. 5,626,957 (Benso et al.), all incorporated herein by reference.

Other useful phosphors are alkaline earth metal phosphors that can be the products of firing starting materials comprising optional oxide and a combination of species characterized by the following formula (2):

$$MFX_{1-z}I_{z}uM^{a}X^{a}:yA:eQ:tD \quad (2)$$

wherein "M" is magnesium (Mg), calcium (Ca), strontium (Sr), or barium (Ba), "F" is fluoride, "X" is chloride (Cl) or bromide (Br), "I" is iodide, Ma is sodium (Na), potassium (K), rubidium (Rb), or cesium (Cs), Xa is fluoride (F), chloride (Cl), bromide (Br), or iodide (I), "A" is europium (Eu), cerium (Ce), samarium (Sm), or terbium (Th), "Q" is BeO, MgO, CaO, SrO, BaO, ZnO, $Al_2O_3$, $La_2O_3$, In203, $SiO_2$, $TiO_2$, $ZrO_2$, $GeO_2$, $SnO_2$, $Nb_2O_5$, $Ta_2O_5$, or $ThO_2$, "D" is vanadium (V), chromium (Cr), manganese (Mn), iron (Fe), cobalt (Co), or nickel (Ni). The numbers in the noted formula are the following: "z" is 0 to 1, "u" is from 0 to 1, "y" is from $1\times10^{-4}$ to 0.1, "e" is form 0 to 1, and "t" is from 0 to 0.01. These definitions apply wherever they are found in this application unless specifically stated to the contrary. It is also contemplated that "M", "X", "A", and "D" represent multiple elements in the groups identified above.

The fluorescent intensifying screens useful in this invention exhibit screen speeds of at least 200. The preferred phosphor is a gadolinium oxysulfide:terbium. Moreover, the particle size distribution of the phosphor particles is an important factor in determining the speed and sharpness of the screen. For example, at least 50% of the particles have a size of less than 3 $\mu$m and 85% of the particles have a size of less than 5.5 $\mu$m. In addition, the coverage of phosphor in the dried layer is from about 250 to about 450 g/m$^2$, and preferably from about 300 to about 400 g/m$^2$.

Flexible support materials for radiographic screens in accordance with the present invention include cardboard, plastic films such as films of cellulose acetate, polyvinyl chloride, polyvinyl acetate, polyacrylonitrile, polystyrene, polyester, polyethylene terephthalate, polyamide, polyimide, cellulose triacetate and polycarbonate, metal sheets such as aluminum foil and aluminum alloy foil, ordinary papers, baryta paper, resin-coated papers, pigmented papers containing titanium dioxide or the like, and papers sized with polyvinyl alcohol or the like. A plastic film is preferably employed as the support material.

The plastic film may contain a light-absorbing material such as carbon black, or may contain a light-reflecting material such as titanium dioxide or barium sulfate. The former is appropriate for preparing a high-resolution type radiographic screen, while the latter is appropriate for preparing a high-sensitivity type radiographic screen. For use in this invention it is highly preferred that the support absorb substantially all of the radiation emitted by the phosphor. Examples of particularly preferred supports include polyethylene terephthalate, blue colored or black colored (for example, LUMIRROR C, type X30 supplied by Toray Industries, Tokyo, Japan).

These supports may have thicknesses that may differ depending o the material of the support, and may generally be between 60 and 1000 $\mu$m, more preferably between 80 and 500 $\mu$m from the standpoint of handling.

A representative fluorescent intensifying screen useful in the present invention is described in the example below.

An embodiment of the present invention is illustrated in FIG. 1. In reference to the imaging assembly 10 shown in FIG. 1, fluorescent intensifying screen 20 is arranged in association with radiographic silver halide film 30 in cassette holder 40.

Preferred embodiments of this invention include a radiographic imaging assembly comprising:

A) a radiographic silver halide film comprising a support having first and second major surfaces and that is capable of transmitting X20 radiation, the radiographic silver halide film having a film speed of at least 100, the radiographic silver halide film having disposed on the first major support surface, one or more hydrophilic colloid layers including at least one cubic grain silver halide emulsion layer, and on the second major support surface, one or more hydrophilic colloid layers including at least one tabular grain silver halide emulsion layer,
the cubic grain silver halide emulsion layer having cubic silver halide grains of the same composition and being composed of at least 80 mol % bromide based on total silver in the emulsion layer, and
having a protective overcoat disposed over the silver halide emulsion layers on each side of the support, and further comprising an antihalation layer disposed on the second major support surface, B) a single fluorescent intensifying screen that has a screen speed of at least 200 and comprises a gadolinium oxysulfide:terbium phosphor capable of absorbing X-rays and emitting electromagnetic radiation having a wavelength greater than 300 nm, the phosphor being coated in admixture with a polymeric binder in a phosphor layer onto a flexible polymeric support and having a protective overcoat disposed over the phosphor layer,
wherein the phosphor is present as particles wherein at least 50% of the particles have a size of less than 3 $\mu$m and at least 85% of the particles have a size of less than 5.5 $\mu$m, and the coverage of the phosphor in the phosphor layer is from about 300 to about 400 $g/m^2$.

Exposure and processing of the radiographic silver halide films can be undertaken in any convenient conventional manner. The exposure and processing techniques of U.S. Pat. No. 5,021,327 and U.S. Pat. No. 5,576,156 (both noted above) are typical for processing radiographic films. Other processing compositions (both developing and fixing compositions) are described in U.S. Pat. No. 5,738,979 (Fitterman et al.), U.S. Pat. No. 5,866,309 (Fitterman et al.), U.S. Pat. No. 5,871,890 (Fitterman et al.), U.S. Pat. No. 5,935,770 (Fitterman et al.), U.S. Pat. No. 5,942,378 (Fitterman et al.), all incorporated herein by reference. The processing compositions can be supplied as single- or multi-part formulations, and in concentrated form or as more diluted working strength solutions.

Exposing X-radiation is generally directed through a fluorescent intensifying screen before it passes through the radiographic silver halide film for imaging soft tissue such as breast tissue.

It is particularly desirable that the radiographic silver halide films be processed within 90 seconds ("dry-to-dry") and preferably within 45 seconds and at least 20 seconds, for the developing, fixing and any washing (or rinsing) steps. Such processing can be carried out in any suitable processing equipment including but not limited to, a Kodak X-OMAT™ RA 480 processor that can utilize Kodak Rapid Access processing chemistry. Other "rapid access processors" are described for example in U.S. Pat. No. 3,545,971 (Barnes et al.) and EP 0 248,390A1 (Akio et al.). Preferably, the black-and-white developing compositions used during processing are free of any gelatin hardeners, such as glutaraldehyde.

Since rapid access processors employed in the industry vary in their specific processing cycles and selections of processing compositions, the preferred radiographic films satisfying the requirements of the present invention are specifically identified as those that are capable of dry-to-dye processing according to the following reference conditions:

| | |
|---|---|
| Development | 11.1 seconds at 35° C., |
| Fixing | 9.4 seconds at 35° C., |
| Washing | 7.6 seconds at 35° C., |
| Drying | 12.2 seconds at 55–65° C. |

Any additional time is taken up in transport between processing steps. Typical black-and-white developing and fixing compositions are described in the Example below.

Radiographic kits can include a radiographic imaging assembly of this invention, one or more additional fluorescent intensifying screens and/or metal screens, and/or one or more suitable processing compositions (for example black-and-white developing and fixing compositions).

The following example is presented for illustration and the invention is not to be interpreted as limited thereby.

EXAMPLE

Radiographic Film A (Control):

Radiographic Film A was a single-coated film having the a silver halide emulsion on one side of a blue-tinted 170 $\mu$m transparent poly(ethylene terephthalate) film support and a pelloid layer on the opposite side. The emulsion was chemically sensitized with sulfur and gold and spectrally sensitized with the following dye A-1:

A-1

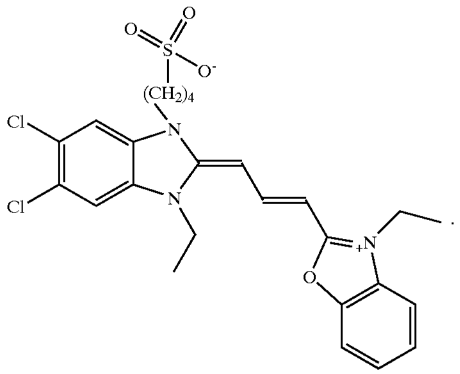

Radiographic Film A had the following layer arrangement:

Overcoat
Interlayer
Emulsion Layer
Support
Pelloid Layer
Overcoat

The noted layers were prepared from the following formulations.

| | Coverage ($mg/dm^2$) |
|---|---|
| Overcoat Formulation | |
| Gelatin vehicle | 4.4 |
| Methyl methacrylate matte beads | 0.35 |
| Carboxymethyl casein | 0.73 |
| Colloidal silica (LUDOX AM) | 1.1 |
| Polyacrylamide | 0.85 |
| Chrome alum | 0.032 |
| Resorcinol | 0.073 |
| Dow Corning Silicone | 0.153 |
| TRITON X-200 surfactant (Union Carbide) | 0.26 |
| LODYNE S-100 surfactant (Ciba Specialty Chem.) | 0.0097 |
| Interlayer Formulation | |
| Gelatin vehicle | 4.4 |
| Emulsion Layer Formulation | |
| Cubic grain emulsion [AgBr 0.85 μm average ECD] | 51.1 |
| Gelatin vehicle | 34.9 |
| Spectral sensitizing dye A-1 | 250 mg/Ag mole |
| 4-Hydroxy-6-methyl-1,3,3a,7-tetraazaindene | 1 g/Ag mole |
| Maleic acid hydrazide | 0.0075 |
| Catechol disulfonate | 0.42 |
| Glycerin | 0.22 |
| Potassium bromide | 0.14 |
| Resorcinol | 2.12 |
| Bisvinylsulfonylmethane | 0.4% based on total gelatin in all layers on same side |
| Pelloid Layer | |
| Gelatin | 43 |
| Dye C-1 noted below | 0.31 |
| Dye C-2 noted below | 0.11 |
| Dye C-3 noted below | 0.13 |
| Dye C-4 note below | 0.12 |
| Bisvinylsulfonylmethane | 0.4% based on total gelatin in all layers on same side |

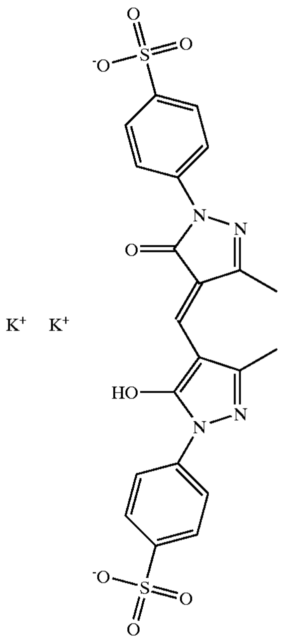

C-1

-continued

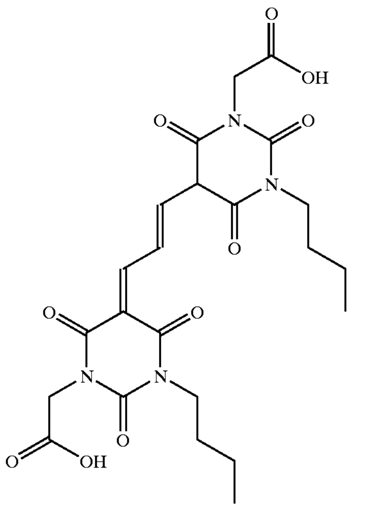

C-2

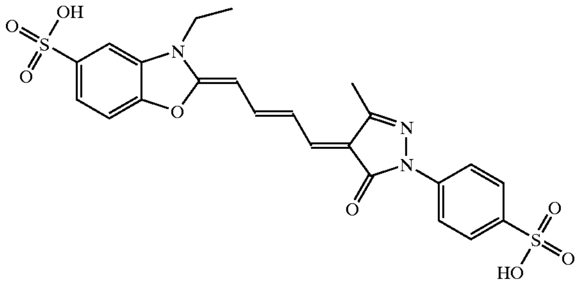

C-3

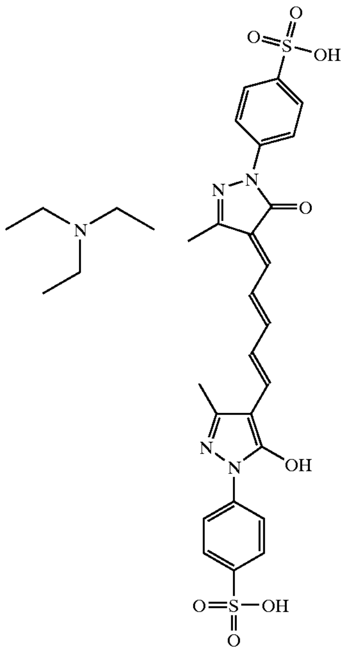

C-4

Radiographic Film B (Control):

Radiographic Film B was a dual-coated radiographic film with 2/3 of the silver and gelatin coated on one side of the support and the remainder coated on the opposite side of the support. It also included a halation control layer containing solid particle dyes to provide improved sharpness. The film contained a green-sensitive, high aspect ratio tabular silver bromide grain emulsion on both sides of the support. Thus, at least 50% of the total grain projected area is accounted for by tabular grains having a thickness of less than 0.3 μm and having an average aspect ratio greater than 8:1. The emulsion average grain diameter was 2.0 μm and the average grain thickness was 0.10 μm. It was polydisperse in distribution and had a coefficient of variation of 38. The emulsion was spectrally sensitized with anhydro-5,5-dichloro-9-ethyl-3,3'-bis(3-sulfopropyl)oxacarbocyanine hydroxide (680 mg/Ag mole), followed by potassium iodide (300 mg/Ag mole). Film B had the following layer arrangement and formulations on the film support:

Overcoat 1
Interlayer
Emulsion Layer 1
Support
Emulsion Layer 2
Halation Control Layer
Overcoat 2

| | Coverage ($mg/dm^2$) |
|---|---|
| Overcoat 1 Formulation | |
| Gelatin vehicle | 4.4 |
| Methyl methacrylate matte beads | 0.35 |
| Carboxymethyl casein | 0.73 |
| Colloidal silica (LUDOX AM) | 1.1 |
| Polyacrylamide | 0.85 |
| Chrome alum | 0.032 |
| Resorcinol | 0.73 |
| Dow Corning Silicone | 0.153 |
| TRITON X-200 surfactant | 0.26 |
| LODYNE S-100 surfactant | 0.0097 |
| Interlayer Formulation | |
| Gelatin vehicle | 4.4 |
| Emulsion Layer 1 Formulation | |
| Cubic grain emulsion [AgBr 0.85 μm average ECD] | 40.3 |
| Gelatin vehicle | 29.6 |
| 4-Hydroxy-6-methyl-1,3,3a,7-tetraazaindene | 1 g/Ag mole |
| 1-(3-Acetamidophenyl)-5-mercaptotetrazole | 0.026 |
| Maleic acid hydrazide | 0.0076 |
| Catechol disulfonate | 0.2 |
| Glycerin | 0.22 |
| Potassium bromide | 0.13 |
| Resorcinol | 2.12 |
| Bisvinylsulfonylmethane | 0.4% based on total gelatin in all layers on same side |
| Emulsion Layer 2 Formulation | |
| Tabular grain emulsion [AgBr 2.0 × 0.10 μm average size] | 10.8 |
| Gelatin vehicle | 16.1 |
| 4-Hydroxy-6-methyl-1,3,3 a,7-tetraazaindene | 2.1 g/Ag mole |
| 1-(3-Acetamidophenyl)-5-mercaptotetrazole | 0.013 |
| Maleic acid hydrazide | 0.0032 |
| Catechol disulfonate | 0.2 |
| Glycerin | 0.11 |
| Potassium bromide | 0.06 |
| Resorcinol | 1.0 |
| Bisvinylsulfonylmethane | 2% based on total gelatin in all layers on same side |

-continued

| | |
|---|---|
| Halation Control Layer | |
| Magenta filter dye M-1 (noted below) | 2.2 |
| Gelatin | 10.8 |
| Overcoat 2 Formulation | |
| Gelatin vehicle | 8.8 |
| Methyl methacrylate matte beads | 0.14 |
| Carboxymethyl casein | 1.25 |
| Colloidal silica (LUDOX AM) | 2.19 |
| Polyacrylamide | 1.71 |
| Chrome alum | 0.066 |
| Resorcinol | 0.15 |
| Dow Corning Silicone | 0.16 |
| TRITON X-200 surfactant | 0.26 |
| LODYNE S-100 surfactant | 0.01 |

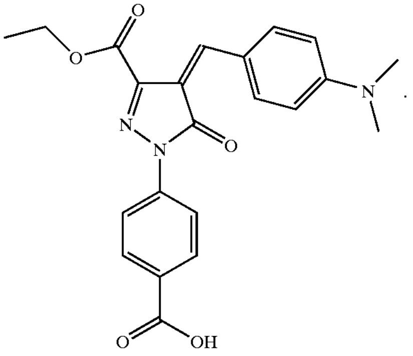

M-1

Radiographic Film C (Invention)

Film C was like Film B except for the following features:

1) Emulsion Layer 1 contained a AgIClBr (0.5:15:84.5 halide mole ratio) cubic grain emulsion that was chemically sensitized with sulfur an gold and spectrally sensitized with a 1:1 molar ratio of dyes A-2 and B-1 (noted below). The emulsion was doped with ruthenium hexacyanide (50 mg/Ag mole).

2) Emulsion Layer 1 contained dextran (8 mg/dm 2) in place of the same amount of gelatin and contained 0.8% of the same hardener.

Film C has a film speed of at least 100.

A-2

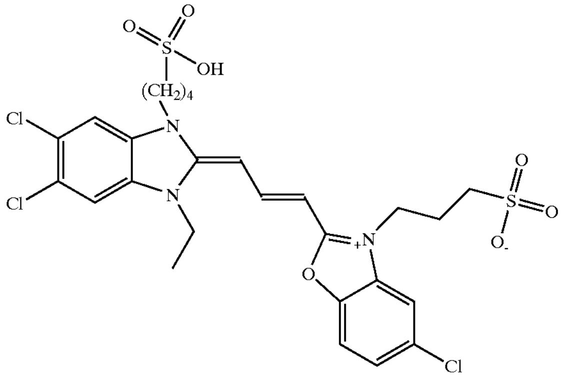

-continued

B-1

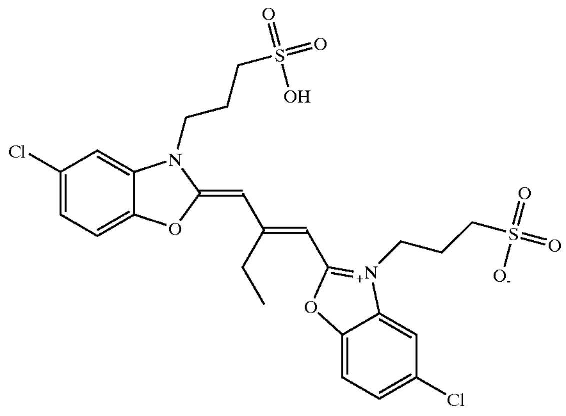

The cassettes used in the practice of this invention were those commonly used in mammography.

Fluorescent intensifying screen "X" had the same composition and structure as commercially available KODAK Min-R 2190 Screen. It comprised a terbium activated gadolinium oxysulfide phosphor (median particle size of about 5.2 μm) dispersed in a Permuthane™ polyurethane binder on a blue-tinted poly(ethylene terephthalate) film support. The total phosphor coverage was 340 g/$m^2$ and the phosphor to binder weight ratio was 21:1.

Fluorescent intensifying screen "Y" is a novel screen and contained a terbium activated gadolinium oxysulfide phosphor (median particle size of about 3.0 μm) dispersed in a Permuthane™ polyurethane binder on a blue-tinted poly (ethylene terephthalate) film support. The total phosphor coverage was 330 g/$m^2$ and the phosphor to binder weight ratio was 29:1. This screen has a screen speed of at least 200.

In the practice of this invention, a single screen was placed in back of the film to form a radiographic imaging assembly.

Samples of the films in the imaging assemblies were exposed through a graduated density step tablet to a MacBeth sensitometer for 0.5 second to a 500-watt General Electric DMX projector lamp that was calibrated to 2650° K filtered with a Corning C4010 filter to simulate a green-emitting X-ray screen exposure. The film samples were processed using a processor commercially available under the trademark KODAK RP X-OMAT® film Processor M6A–N, M6B, or M35A. Development was carried out using the following black-and-white developing composition:

| | |
|---|---|
| Hydroquinone | 30 g |
| Phenidone | 1.5 g |
| Potassium hydroxide | 21 g |
| $NaHCO_3$ | 7.5 g |
| $K_2SO_3$ | 44.2 g |
| $Na_2S_2O_5$ | 12.6 g |
| Sodium bromide | 35 g |
| 5-Methylbenzotriazole | 0.06 g |
| Glutaraldehyde | 4.9 g |
| Water to 1 liter, pH 10 | |

The film samples were processed in each instance for less than 90 seconds. Fixing was carried out using KODAK RP X-OMAT® LO Fixer and Replenisher fixing composition (Eastman Kodak Company).

Rapid processing has evolved over the last several years as a way to increase productivity in busy hospitals without compromising image quality or sensitometric response. Where 90-second processing times were once the standard, below 40-second processing is becoming the standard in medical radiography. One such example of a rapid processing system is the commercially available KODAK Rapid Access (RA) processing system that includes a line of X-radiation sensitive films available as T-Mat-RA radiographic films that feature fully forehardened emulsions in order to maximize film diffusion rates and minimize film drying. Processing chemistry for this process is also available. As a result of the film being fully forehardened, glutaraldehyde (a common hardening agent) can be removed from the developer solution, resulting in ecological and safety advantages (see KODAK KWIK Developer below). The developer and fixer designed for this system are Kodak X-OMAT® RA/30 chemicals. A commercially available processor that allows for the rapid access capability is the Kodak X-OMAT® RA 480 processor. This processor is capable of running in 4 different processing cycles. "Extended" cycle is for 160 seconds, and is used for mammography where longer than normal processing results in higher speed and contrast. "Standard" cycle is 82 seconds, "Rapid Cycle" is 55 seconds and "KWIK/RA" cycle is 40 seconds (see KODAK KWIK Developer below). The KWIK cycle uses the RA/30 processing compositions while the longer time cycles use standard commercially available RP X-OMAT compositions. The following Table I shows typical processing times (seconds) for these various processing cycles.

TABLE I

| Cycle | Extended | Standard | Rapid | KWIK |
|---|---|---|---|---|
| Black-and-white Development | 44.9 | 27.6 | 15.1 | 11.1 |
| Fixing | 37.5 | 18.3 | 12.9 | 9.4 |
| Washing | 30.1 | 15.5 | 10.4 | 7.6 |
| Drying | 47.5 | 21.0 | 16.6 | 12.2 |
| Total | 160.0 | 82.4 | 55 | 40.3 |

The black-and-white developing composition useful for the KODAK KWIK cycle contains the following components:

| | |
|---|---|
| Hydroquinone | 32 g |
| 4-Hydroxymethyl-4-methyl-1-phenyl-3-pyrazolidone | 6 g |
| Potassium bromide | 2.25 g |
| 5-Methylbenzotriazole | 0.125 g |
| Sodium sulfite | 160 g |
| Water to 1 liter, pH 10.35 | |

Optical densities are expressed below in terms of diffuse density as measured by a conventional X-rite Model 310™ densitometer that was calibrated to ANSI standard PH 2.19 and was traceable to a National Bureau of Standards calibration step tablet. The characteristic D vs. logE curve was plotted for each radiographic film that was imaged and processed. Gamma (contrast) is the slope (derivative) of the noted curves. System speed was obtained as described above.

Image tone was determined using the conventional a* and b* color values. Dye stain was determined by measuring the optical density of the film at 505 nm minus a background density at 700 nm.

"Noise" was determined by a visual comparison to the conventional KODAK Min-R 2000 Mammography film and KODAK Min-R 2000 intensifying screen.

"Uniformity M35" refers to a subjective evaluation of the uniformity of processing the film samples in a conventional M35 processor after the film samples were given a uniform flash exposure.

The "% Drying" was determined by feeding an exposed film flashed to result in a density of 1.0 into an X-ray processing machine in the KODAK KWIK cycle. As the film just exits the drier section, the processing machine was stopped and the film was removed. Roller marks from the processing machine can be seen on the film where the film has not yet dried. Marks from 100% of the rollers in the drier indicate the film has just barely dried. Values less than 100% indicate the film was dried partway into the drier. The lower the value the better the film is for drying.

The following TABLE II shows the relative sensitometry of Films A–C. It is apparent from the data that Control Films A and B used in combination with the commercially available screen "X" provided similar system speed and contrast, excellent sharpness and a moderate level of noise from the use of relatively large silver halide grains. The imaging assembly comprising Film C and screen "Y", however, provided similar sharpness and lower total noise. In addition, Film C exhibited reduced dye stain.

TABLE II

| Film | Cubic Grain ECD ($\mu$m) | Screen | Speed | Contrast | Sharpness | Noise | Image Tone | Dye Stain |
|---|---|---|---|---|---|---|---|---|
| A (Control) | 0.85 | X | 150 | 3.92 | High | Medium | −9.6 | 0.58 |
| B (Control) | 0.85 | X | 150 | 3.7 | High | Medium | −9.0 | 0.048 |
| C (Invention) | 0.73 | Y | 151 | 4.9 | High | Low | −9.7 | 0.033 |

In addition, the following TABLE III shows that Control Film A did not dry well in the "rapid" cycle process and exhibited poor uniformity in the M35 processor as well as a conventional shallow tray processor. Control Film B performed better in several respects. Film C demonstrated improved processability in all respects including improved film drying characteristics.

TABLE III

| Film | Drying | Uniformity M35 | Emulsion Orientation | Shallow Tray |
|---|---|---|---|---|
| A (Control) | Did not dry | Poor | Poor | Poor |
| B (Control) | 80% | Poor | Poor | Good |
| C (Invention) | 65% | Good | Good | Good |

The invention has been described in detail with particular reference to preferred embodiments thereof, but it will be understood that variations and modifications can be effected within the spirit and scope of the invention.

We claim:

1. A radiographic imaging assembly comprising:

A) a radiographic silver halide film comprising a support having first and second major surfaces and that is capable of transmitting X-radiation, said radiographic silver halide film having a film speed of at least 100, said radiographic silver halide film having disposed on the first major support surface, one or more hydrophilic colloid layers including at least one silver halide emulsion layer, and on the second major support surface, one or more hydrophilic colloid layers including at least one silver halide emulsion layer, at least one of said silver halide emulsion layers comprising cubic silver halide grains that have the same or different composition, and B) a single fluorescent intensifying screen that has a screen speed of at least 200 and comprises an inorganic phosphor capable of absorbing X-rays and emitting electromagnetic radiation having a wavelength greater than 300 nm, said inorganic phosphor being coated in admixture with a polymeric binder in a phosphor layer onto a flexible support and having a protective overcoat disposed over said phosphor layer.

2. The radiographic imaging assembly of claim 1 wherein said cubic silver halide grains are composed of at least 80 mol % bromide based on total silver in the emulsion.

3. The radiographic imaging assembly of claim 1 wherein the at least one silver halide emulsion on the second major support surface comprises predominantly tabular silver halide grains.

4. The radiographic imaging assembly of claim 1 wherein said film comprises a protective overcoat over said silver halide emulsion on each side of said support.

5. The radiographic imaging assembly of claim 1 further comprising an antihalation layer disposed on said second major support surface.

6. The radiographic imaging assembly of claim 1 wherein said cubic silver halide grains in said radiographic silver halide film are doped with a ruthenium hexacoordination complex dopant.

7. The radiographic imaging assembly of claim 1 wherein said radiographic silver halide film comprises a polymer vehicle on each side of its support in a total amount of from about 35 to about 45 mg/dm$^2$ and a level of silver on each side of from about 10 to about 55 mg/dm$^2$.

8. The radiographic imaging assembly of claim 1 wherein said cubic grain silver halide emulsion includes dextran with gelatin or a gelatin derivative as the hydrophilic binders.

9. The radiographic imaging assembly of claim 1 wherein said inorganic phosphor is calcium tungstate, activated or unactivated lithium stannates, niobium and/or rare earth activated or unactivated yttrium, lutetium, or gadolinium tantalates, rare earth-activated or unactivated middle chalcogen phosphors such as rare earth oxychalcogenides and oxyhalides, or terbium-activated or unactivated lanthanum or lutetium middle chalcogen phosphor.

10. The radiographic imaging assembly of claim 1 wherein said inorganic phosphor contains hafnium.

11. The radiographic imaging assembly of claim 1 wherein said inorganic phosphor is a rare earth oxychalcogenide and oxyhalide phosphor that is represented by the following formula (1):

$$M'_{(w-n)}M''_{n}O_{w}X' \quad (1)$$

wherein M' is at least one of the metals yttrium (Y), lanthanum (La), gadolinium (Gd), or lutetium (Lu), M" is at least one of the rare earth metals, preferably dysprosium (Dy), erbium (Er), europium (Eu), holmium (Ho), neodymium (Nd), praseodymium (Pr), samarium (Sm), tantalum (Ta), terbium (Th), thulium (Tm), or ytterbium (Yb), X' is a middle chalcogen (S, Se, or Te) or halogen, n is 0.002 to 0.2, and w is 1 when X' is halogen or 2 when X' is a middle chalcogen.

12. The radiographic imaging assembly of claim 11 wherein said inorganic phosphor is a lanthanum oxybromides, or terbium-activated or thulium-activated gadolinium oxides.

13. The radiographic imaging assembly of claim 1 wherein said inorganic phosphor is an alkaline earth metal phosphor that is the product of firing starting materials comprising optional oxide and a combination of species characterized by the following formula (2):

$$MFX_{1-z}I_z uM^aX^a{:}yA{:}eQ{:}tD \quad (2)$$

wherein "M" is magnesium (Mg), calcium (Ca), strontium (Sr), or barium (Ba), "F" is fluoride, "X" is chloride (Cl) or bromide (Br), "I" is iodide, Ma is sodium (Na), potassium (K), rubidium (Rb), or cesium (Cs), Xa is fluoride (F), chloride (Cl), bromide (Br), or iodide (I), "A" is europium (Eu), cerium (Ce), samarium (Sm), or terbium (Th), "Q" is BeO, MgO, CaO, SrO, BaO, ZnO, $Al_2O_3$, $La_2O_3$, In203, $SiO_2$, $TiO_2$, $ZrO_2$, $GeO_2$, $SnO_2$, $Nb_2O_5$, $Ta_2O_5$, or $ThO_2$, "D" is vanadium (V), chromium (Cr), manganese (Mn), iron (Fe), cobalt (Co), or nickel (Ni), "z" is 0 to 1, "u" is from 0 to 1, "y" is from $1\times10^{-4}$ to 0.1, "e" is form 0 to 1, and "t" is from 0 to 0.01.

14. The radiographic imaging assembly of claim 1 wherein said inorganic phosphor is present as particles wherein at least 50% of the particles have a size of less than 3 μm and at least 85% of the particles have a size of less than 5.5 μm, and the coverage of said inorganic phosphor in said phosphor layer is from about 300 to about 400 g/$m^2$.

15. A radiographic imaging assembly comprising:

A) a radiographic silver halide film comprising a support having first and second major surfaces and that is capable of transmitting X-radiation, said radiographic silver halide film having a film speed of at least 100, said radiographic silver halide film having disposed on the first major support surface, one or more hydrophilic colloid layers including at least one cubic grain silver halide emulsion layer, and on the second major support surface, one or more hydrophilic colloid layers including at least one tabular grain silver halide emulsion layer, said cubic grain silver halide emulsion layer having cubic silver halide grains of the same composition and being composed of at least 80 mol % bromide based on total silver in said emulsion layer, and having a protective overcoat disposed over said silver halide emulsion layers on each side of said support, and further comprising an antihalation layer disposed on said second major support surface, B) a single fluorescent intensifying screen that has a screen speed of at least 200 and comprises a gadolinium oxysulfide:terbium phosphor capable of absorbing X-rays and emitting electromagnetic radiation having a wavelength greater than 300 nm, said phosphor being coated in admixture with a polymeric binder in a phosphor layer onto a flexible polymeric support and having a protective overcoat disposed over said phosphor layer, wherein said phosphor is present as particles wherein at least 50% of the particles have a size of less than 3 μm and at least 85% of the particles have a size of less than 5.5 μm, and the coverage of said phosphor in said phosphor layer is from about 300 to about 400 g/$m^2$.

16. A method of providing a black-and-white image comprising exposing the radiographic imaging assembly of claim 1, and processing said radiographic silver halide film, sequentially, with a black-and-white developing composition and a fixing composition, said processing being carried out within 90 seconds, dry-to-dry.

17. The method of claim 16 wherein said black-and-white developing composition is free of any photographic film hardeners.

18. The method of claim 16 being carried out for 60 seconds or less.

* * * * *